United States Patent
Hemmis

(12) 
(10) Patent No.: US 8,328,400 B1
(45) Date of Patent: Dec. 11, 2012

(54) STROLLER WHEELS WITH LIGHT SYSTEM

(76) Inventor: Terry L. Hemmis, Rosamond, CA (US)

( * ) Notice: Subject to any disclaimer, the term of this patent is extended or adjusted under 35 U.S.C. 154(b) by 281 days.

(21) Appl. No.: 12/764,651

(22) Filed: Apr. 21, 2010

(51) Int. Cl.
*F21L 13/00* (2006.01)

(52) U.S. Cl. ......... 362/500; 362/459; 362/157; 362/170

(58) Field of Classification Search .................. 362/459, 362/473, 500, 157, 170, 646, 800
See application file for complete search history.

(56) References Cited

U.S. PATENT DOCUMENTS

| | | | |
|---|---|---|---|
| 5,475,572 A | 12/1995 | Tseng | |
| 5,683,164 A * | 11/1997 | Chien | 362/500 |
| 5,957,541 A | 9/1999 | Seigler | |
| 6,749,321 B2 * | 6/2004 | Luo | 362/192 |
| 6,774,503 B1 * | 8/2004 | Chen | 290/1 R |
| 7,296,918 B1 | 11/2007 | Davaydyuk et al. | |
| 2003/0202356 A1 | 10/2003 | Hung | |

\* cited by examiner

*Primary Examiner* — Anabel Ton

(57) ABSTRACT

A light system comprising a wheel having an outer surface and a center hole, the wheel is attachable to a stroller by sliding the center hole onto an axle of the stroller; a plurality of light components embedded in the wheel, the light components are positioned all along the outer surface of the wheel, the light components are operatively connected to a battery disposed in or on the wheel; and a control switch operatively connected to the light components, the control switch can move between an on position to turn on the light components and an off position to turn off the light components, wherein the control switch is biased in the off position and can be moved to the on position via centrifugal force, the centrifugal force being obtained by spinning of the wheel.

7 Claims, 5 Drawing Sheets

(In Use)

(Side View)

(Cut Section)

(Alternate Embodiment)

STROLLER WHEELS WITH LIGHT SYSTEM

FIELD OF THE INVENTION

The present invention is directed to wheels for strollers, more particularly to wheels comprising a light system for making the wheels more visible to pedestrians and drivers.

BACKGROUND OF THE INVENTION

Strollers can be very difficult for drivers to see, particularly during dark conditions or poor weather. The present invention features stroller wheels with a light system for helping to make strollers more visible to others.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a light system comprising a wheel having an outer surface and a center hole, the wheel is attachable to a stroller by sliding the center hole onto an axle of the stroller; a plurality of light components embedded in the wheel, the light components are positioned all along the outer surface of the wheel, the light components are operatively connected to a battery disposed in or on the wheel; and a control switch operatively connected to the light components, the control switch can move between an on position to turn on the light components and an off position to turn off the light components, wherein the control switch is biased in the off position and can be moved to the on position via centrifugal force, the centrifugal force being obtained by spinning of the wheel.

In some embodiments, a cap covers the center hole of the wheel after the wheel has been installed on the stroller. In some embodiments, the light components are light emitting diodes (LED). In some embodiments, the light components are positioned near the center hole of the wheel. In some embodiments, the wheel is transparent or translucent, wherein light components are disposed in the wheel. In some embodiments, the battery is disposed in the center hole of the wheel. In some embodiments, the battery is a solar powered battery.

DESCRIPTION OF PREFERRED EMBODIMENTS

Figure 1:
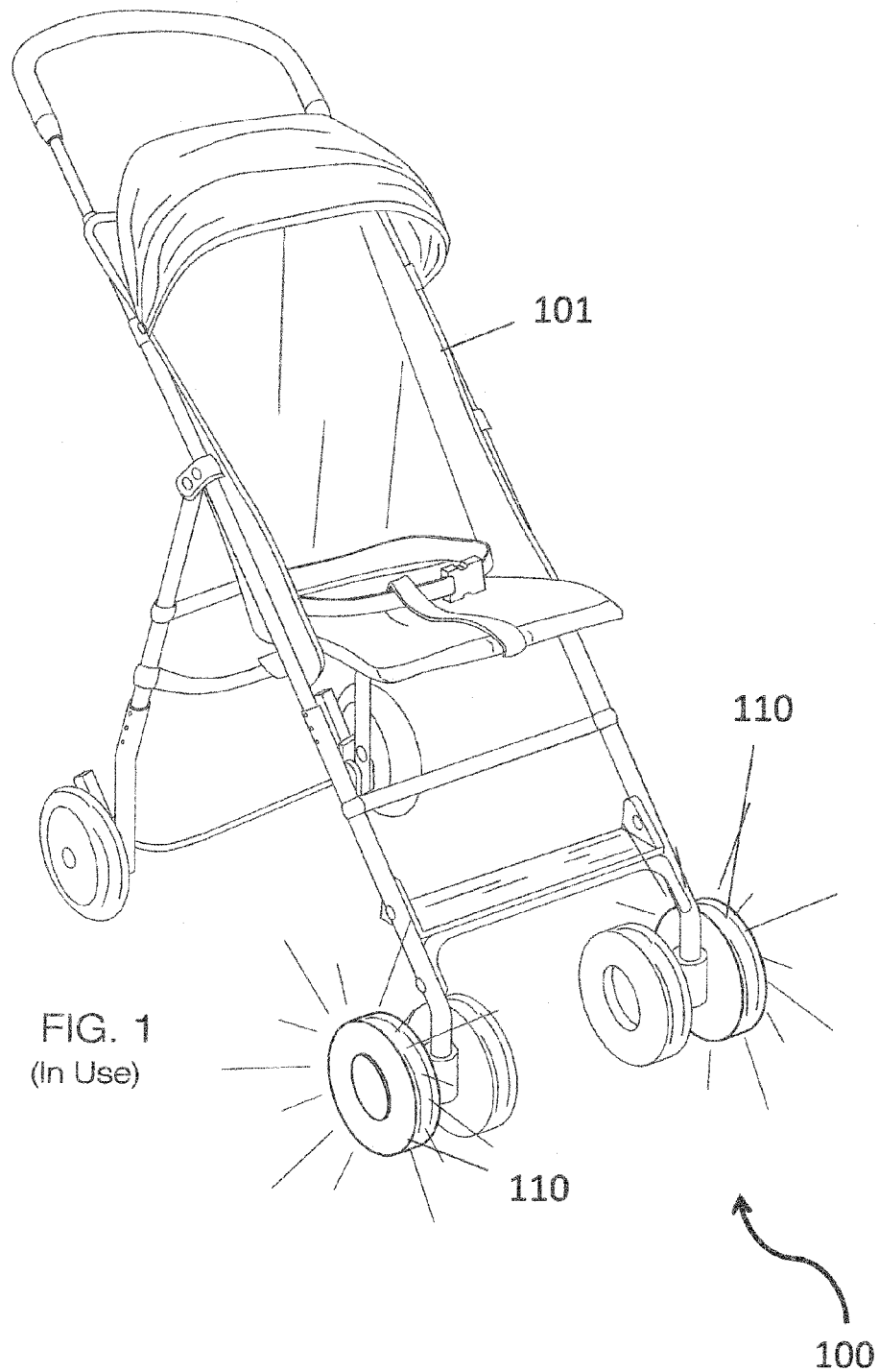
FIG. 1 is a perspective view of the stroller wheel of the present invention as attached to a stroller (in use).
Figure 2:
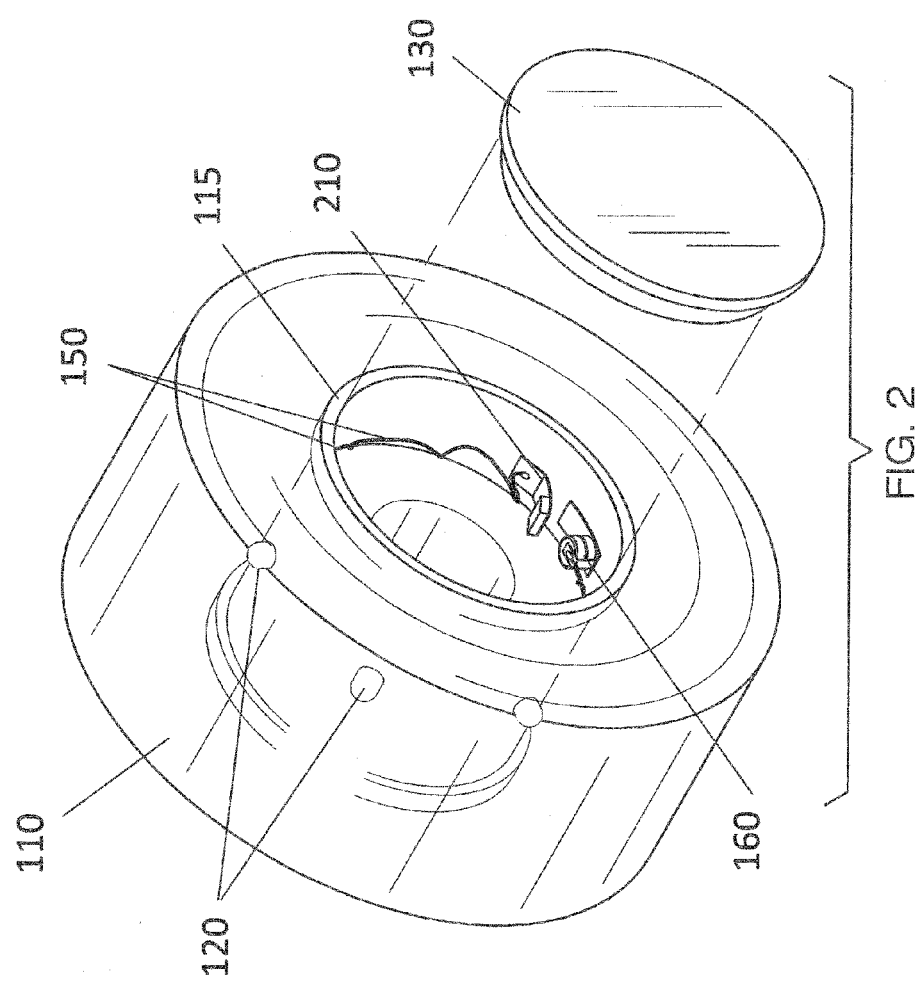
FIG. 2 is a perspective view of the stroller wheel of FIG. 1.
Figure 3:
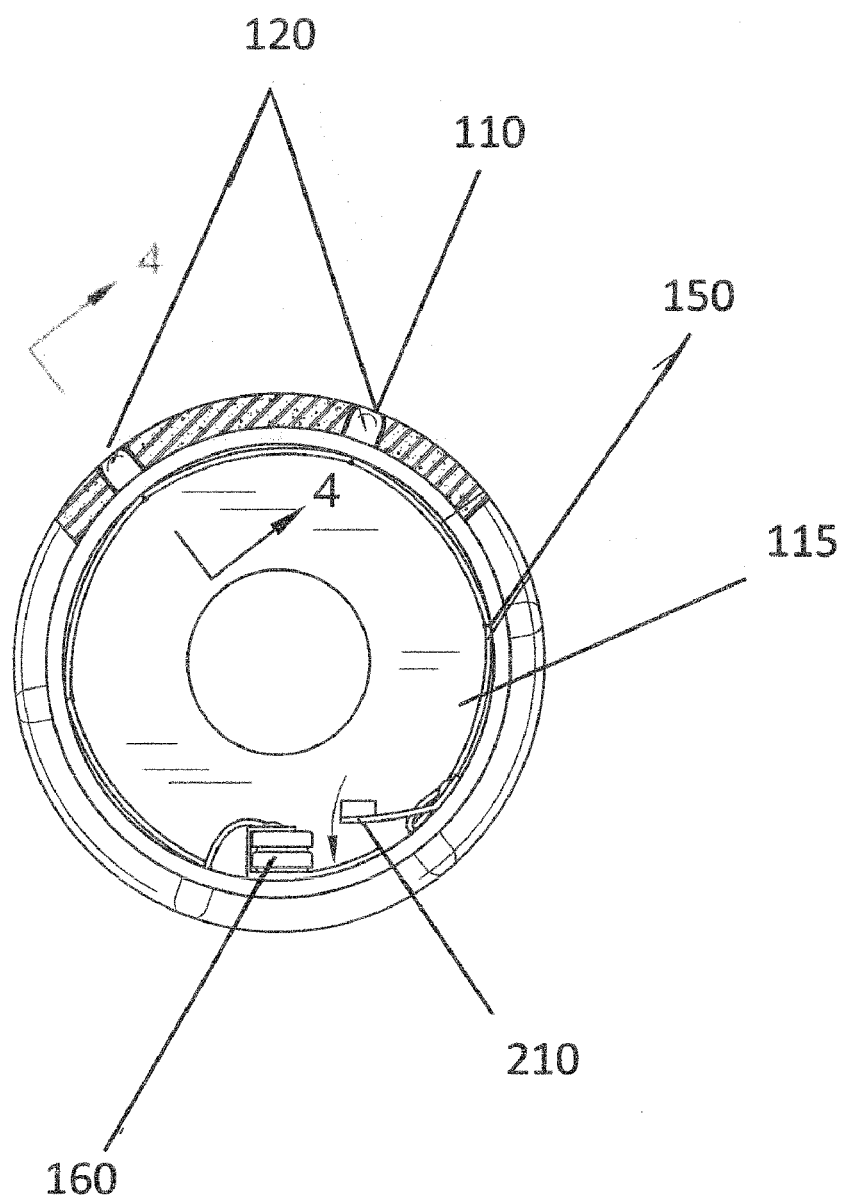
FIG. 3 is a side view and partial cross sectional view of the stroller wheel of FIG. 1
Figure 4:
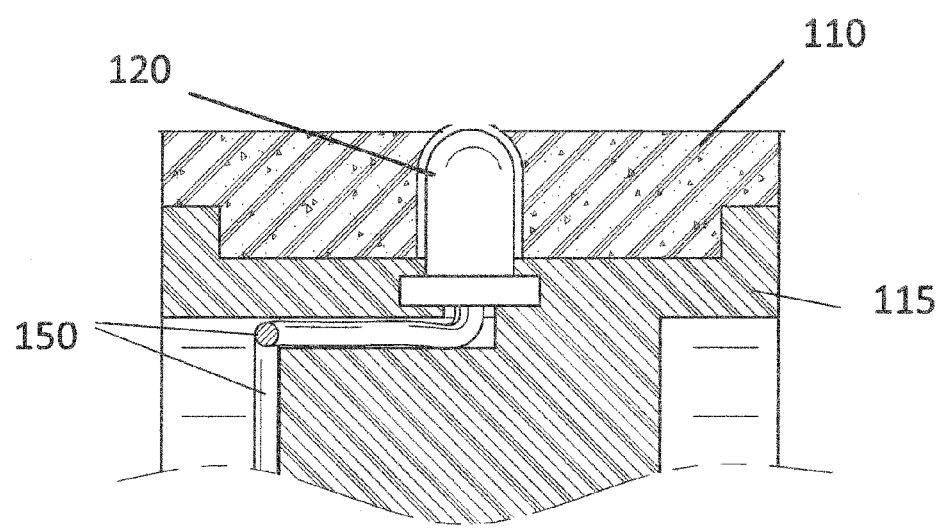
FIG. 4 is a cross sectional view of the stroller wheel of FIG. 1.
Figure 5:
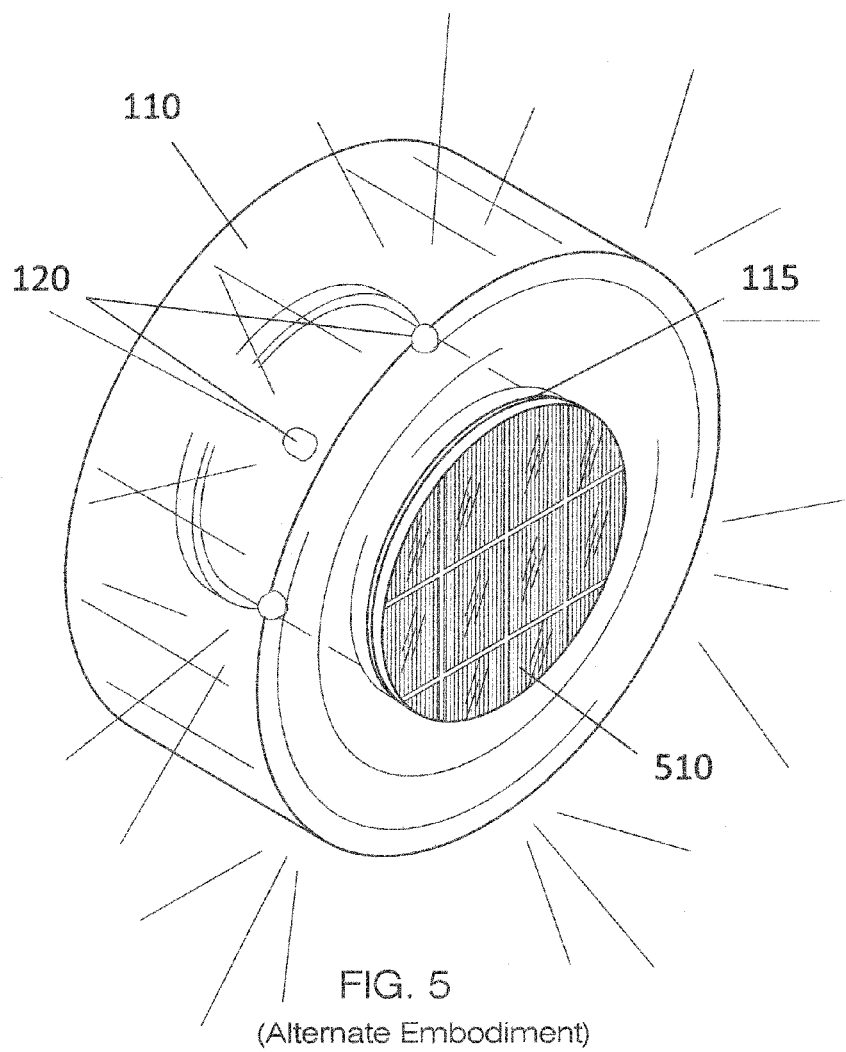
FIG. 5 is a perspective view of an alternative embodiment of the stroller wheel of the present invention.

Referring now to FIG. 1-5, the present invention features a stroller wheel 100 comprising a light system for illuminating the wheel. The light system in the stroller wheel 100 can help make a stroller 101 more visible to drivers and pedestrians.

The stroller wheel 100 of the present invention comprises a wheel 110. The wheel 110 may be similar in shape, size, and composition to standard stroller wheels, which are well known to one of ordinary skill in the art. For example, in some embodiments, the wheel 110 is constructed from a material comprising a rubber, a plastic, a metal, the like, or a combination thereof.

The wheel 110 has an outer surface and a center hole 115. In some embodiments, a wheel 110 is attachable to a stroller 101 by sliding the center hole 115 onto an axle of the stroller. One or more caps 130 may cover the center hole 115 once the wheel 110 has been installed on the stroller 101.

Embedded in the wheel 110 are one or more light components 120. The light components 120 may be light emitting diodes (LED) or other type of illuminating means. In some embodiments, the light components 120 are positioned all along the outer surface (e.g., circumference) of the wheel 110. In some embodiments, the light components 120 are positioned in other locations on the wheel 110, for example near the center hole. In some embodiments, the light components 120 are disposed in the wheel 110 and the wheel 110 is transparent/translucent.

The light components 120 are operatively connected to a power source via one or more wires 150. In some embodiments, the power source is a battery 160. The power source (e.g., battery 160) may be disposed in the wheel 110 or on the wheel 110, for example in the center hole 115 of the wheel 110 (see FIG. 2). In some embodiments, the power source is solar power. For example, the light components 120 are operatively connected to one or more solar cells 510 (see FIG. 5). Solar cells are well known to one of ordinary skill in the art.

The stroller wheel 100 further comprises a control switch 210 for turning on and off the light components 120. The control switch 120 can move between an on position and an off position. In some embodiments, the control switch 210 works via force (e.g., centrifugal force). For example, as the wheel 110 is spun, the switch is forced to the on position. This allows power to be directed from the power source to the light component 120. When the wheel is not spun, the switch returns to the off position, preventing power being directed to the light components 120. Such switches are well known to one of ordinary skill in the art.

In some embodiments, one or more stroller wheels 100 of the present invention may be installed on a stroller 101. For example, two stroller wheels 100 may be attached to the front of the stroller 101, or four stroller wheels 100 may be attached to the front and back of the stroller 101.

Without wishing to limit the present invention to any theory or mechanism, it is believed that the stroller wheels 100 of the present invention are advantageous because the light components 120 are built into the wheel (e.g., rubber of the wheel) and the light components 120 are activated as the stroller is in motion and deactivated when the stroller is stopped. The wheel design helps ensure that others see the stroller, since the lights will be on during movement. The lights of the present invention will attract attention much more readily than other light systems in stroller wheel hubs, therefore ensuring the safety of those in and around the stroller. As the stroller is guided forward, backwards or turns left or right, the lights will be visible. The occupant of the stroller will be safe as visibility is greatly enhanced for drivers or those walking in a dimly lit area.

The following the disclosures of the following U.S. Patents are incorporated in their entirety by reference herein: U.S.

Pat. No. 5,683,164; U.S. Pat. Application No. 2003/0202356; U.S. Pat. No. 5,475,572; U.S. Pat. No. 7,296,918; U.S. Pat. No. 5,957,541.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A light system comprising:
   (a) a wheel having an outer surface and a center hole, the wheel is attachable to a stroller by sliding the center hole onto an axle of the stroller;
   (b) a plurality of light components embedded in the wheel, the light components are positioned all along the outer surface of the wheel, the light components are operatively connected to a battery disposed in or on the wheel; and
   (c) a control switch operatively connected to the light components, the control switch can move between an on position to turn on the light components and an off position to turn off the light components, wherein the control switch is biased in the off position and can be moved to the on position only via centrifugal force, the centrifugal force being obtained by spinning of the wheel, wherein the control switch can be moved to the off position via cessation of spinning of the wheel.

2. The light system of claim 1, wherein a cap covers the center hole of the wheel after the wheel has been installed on the stroller.

3. The light system of claim 1, wherein the light components are light emitting diodes (LED).

4. The light system of claim 1, wherein the light components are positioned near the center hole of the wheel.

5. The light system of claim 1, wherein the wheel is transparent or translucent, wherein light components are disposed in the wheel.

6. The light system of claim 1, wherein the battery is disposed in the center hole of the wheel.

7. The light system of claim 1, wherein the battery is a solar powered battery.

* * * * *